United States Patent [19]
Ellingson et al.

[11] Patent Number: 5,152,958
[45] Date of Patent: Oct. 6, 1992

[54] SPENT NUCLEAR FUEL STORAGE BRIDGE

[75] Inventors: Frederick J. Ellingson, Murrysville; Robert L. Moscardini, Allison Park, both of Pa.

[73] Assignee: U.S. Tool & Die, Inc., Pittsburgh, Pa.

[21] Appl. No.: 643,376

[22] Filed: Jan. 22, 1991

[51] Int. Cl.⁵ ............................................. G21C 19/07
[52] U.S. Cl. ........................................................ 376/272
[58] Field of Search ........................................... 376/272

[56] References Cited

U.S. PATENT DOCUMENTS

| | | | |
|---|---|---|---|
| 3,935,467 | 1/1976 | Gablin | 376/272 |
| 4,029,968 | 6/1977 | Rubinstein et al. | 376/272 |
| 4,058,224 | 11/1977 | Jabsen | 376/272 |
| 4,069,923 | 1/1978 | Blumenau et al. | 376/272 |
| 4,287,426 | 9/1981 | Anthony | 376/272 |
| 4,299,659 | 11/1981 | Hame et al. | 376/272 |
| 4,336,103 | 6/1982 | Kätscher et al. | 376/272 |
| 4,525,324 | 6/1985 | Spilker et al. | 376/272 |
| 4,666,660 | 5/1987 | Wachter | 376/272 |
| 4,780,269 | 10/1988 | Fischer et al. | 376/272 |
| 4,889,681 | 12/1989 | Wachter et al. | 376/272 |

FOREIGN PATENT DOCUMENTS

| | | | |
|---|---|---|---|
| 0054968 | 6/1982 | European Pat. Off. | |
| 2841871 | 4/1980 | Fed. Rep. of Germany | 376/272 |
| 2943455 | 5/1981 | Fed. Rep. of Germany | |
| 3101540 | 8/1982 | Fed. Rep. of Germany | |
| 1-77494 | 8/1986 | Japan | 376/272 |

Primary Examiner—Daniel D. Wasil
Attorney, Agent, or Firm—Clifford A. Poff

[57] ABSTRACT

A spent nuclear fuel storage bridge comprising either a stationary or mobile structure supported from the walls of a spent nuclear fuel storage pool. The structure may have either a pivotally mounted or non-pivotally mounted lower basket or cage portion which occupies a region of the vertical space between the pool water surface and the existing pool floor supported fuel storage racks. Using the bridge, at least a ten-foot deep barrier of biological shield water and at least a two-foot space between the top of the existing racks and the bottom of the bridge can be maintained in a storage pool of typical geometrics and dimensions. By limiting the height of the basket portion of the bridge, up to a three-foot space beneath the biological shield water may be provided to accommodate underwater horizontal transference of spent fuel storage canisters to and from the bridge. The width of the basket portion is determined by the spent fuel length and the resulting storage canister length. Horizontally positioned fuel canisters are stacked vertically within a frame structure or thermal spacer assembly carried internally of the bridge for providing longitudinal and lateral support of the canisters and permitting cooling of the canisters. Also provided are novel fuel storage canister constructions and handling apparatus therefor.

17 Claims, 10 Drawing Sheets

SPENT NUCLEAR FUEL STORAGE BRIDGE

BACKGROUND OF THE INVENTION

1. Field of the Invention

The present invention relates generally to nuclear waste storage systems and, more particularly, to a system for increasing the storage capacity of a water pool used for the storage of spent nuclear fuel rods.

2. Description of the Prior Art

Heretofore, an assortment of methods and apparatus have been developed for storage of spent nuclear fuel. They have included, inter alia, underground burial, "dry storage", and "wet storage". In underground burial, storage of the spent fuel has involved sealing of the fuel in containers and then burying the sealed containers at a predetermined distance beneath the ground surface. Such a system is disclosed in U.S. Pat. No. 3,935,467. Dry storage generally involves the storage of spent fuel in sealed canisters which are placed in racks, wherein the exteriors of the containers are cooled by convention by way of the flow of a cooling gas such as air, in contact therewith. Examples of such a spent nuclear fuel storage system are provided in U.S. Pat. Nos. 4,525,324, and 4,299,659 as well as West German Offenlegungsschrift No. 31 01 540 and European Patent No. 54,968.

Perhaps most commonly, however, spent nuclear fuel rod assemblies, once removed from the nuclear reactor core, are stored in underwater or wet storage areas in specifically designed storage racks for sufficient periods of time to permit the residual reactivity of the nuclear fuel contained therein to dissipate, or until the spent fuel rod assemblies are withdrawn from the pool for transportation to a spent fuel recovery facility. The fuel rods are metal pipes which are filled with nuclear fuel material and are typically 0.4–0.6 inches in diameter and 8 to 15 feet in length. Groups of 64, 128, or more such rods are confined within a fuel rod assembly while they are in a nuclear reactor and subsequently while they are stored in the underwater storage area. It is a normal practice to provide empty spaces in the storage rack between spent fuel rod assemblies to preclude any unintended temperature increase within the underwater storage area. When an underwater storage area has been filled with spent fuel rod assemblies in such a manner, there is no space remaining within the storage area for additional spent fuel rod assemblies.

Increasing the density of the material stored in the underwater storage area allows a greater amount of nuclear waste material to be stored in the limited available space of the underwater storage area. To accomplish this end, it has been proposed to withdraw the spent fuel rods from the assembly in which they have a normal spacing and to compact the spent fuel rods in a canister in which the fuel rods are compacted in tighter spaces. The more compact spent nuclear fuel rods do not present the same tendency for temperature increase and can be stored in adjacent and contiguous spaces in a storage rack, thereby increasing the storage capacity of an existing storage rack three-fold.

The primary approaches to support spent fuel rod assemblies in an underwater storage area or "pool" can be classified as floor-supported and wall-supported storage systems. In floor-supported systems, such as those described in U.S. Pat. Nos. 4,889,681; 4,666,660; 4,336,103; 4,069,923 and 4,029,968, the entire weight, or a portion thereof, of the fuel storage rack and the stored spent fuel assemblies is borne upon the floor of the storage pool.

A major factor limiting the increase of the storage capacity of floor-supported storage systems, however, is that the loading capacity of the floor of the storage area may be exceeded by such increased storage. Additionally, because it is essential to maintain the spent fuel rods under at least 10 feet of biological shield water at all times, including those times when the spent fuel rods are being transferred from their fuel rod assemblies into a compacted fuel rod canister. The great volume of water further increases the loading exerted on the floor. The floor loading, therefore, is the weight of the volume of water in the storage area, the storage rack and the spent fuel rod canisters contained therein.

In order to reduce the weight exerted by the fuel rack assemblies on the pool floor, U.S. Pat. Nos. 4,889,681 and 4,666,660 have proposed attaching buoyant chamber means to the top of the spent fuel rack assemblies.

In wall-supported storage systems, such as those described in U.S. Pat. No. 4,287,426 and West German Patent No. 29 43 455, the spent fuel rack assemblies are generally suspended from upper portions of the walls of the pool whereby the assemblies are spaced some distance from the walls and the floor of the pool. Particular advantages to such systems include: 1) their inherent resistance to the effects of seismic shock and the potentially damaging ground displacements attendant thereto by virtue of the system being suspended a predetermined distance from the pool floor and walls, 2) their capacity to distribute to the weight of the fuel rack assemblies through the reinforced walls of the pool and thereby over a greater area of the surrounding earth, and 3) their avoidance of the pool floor as a support surface. However, the vertical orientation of the fuel canisters in the fuel racks of these wall-supported systems has prevented these systems from being safely used with other fuel storage rack systems in the same storage pool in order to increase the storage efficiency of the volume of the pool.

Except for U.S. Pat. No. 4,029,968, none of the aforementioned patent disclosures has provided any means or methods for increasing the storage efficiency of the volume of a spent nuclear fuel storage pool. In that patent, it was proposed to vertically stack a plurality of interconnected spent fuel storage racks, each of which support clusters of vertically oriented fuel storage canisters, atop one another with the bottom rack being supported by the pool floor. While such disclosure is seen as an advancement in the concept of increasing the storage efficiency of the volume of a spent fuel storage pool, it is seen as a design which is potentially harmful to the structure of the pool, particularly the floor thereof, because the concentrated weight of the plurality of vertically-stacked spent fuel rack assemblies is applied directly to the pool floor, thereby providing a greatly increased likelihood of exceeding the loading capacity of the floor. Moreover, the depth of pool required for safe storage of the vertically stacked racks usually greatly surpassed the depth of existing storage pools at most nuclear facilities. Therefore, in order to accommodate such a storage system, new, especially deep, and somewhat unconventional pools would have to be constructed at most facilities, hence involving potentially immense capital investments in new plant constructions as well as retrofitting existing facilities.

An advantage exists, therefore, for a spent nuclear fuel storage rack system which increases the storage efficiency of the volume of spent nuclear fuel storage pools of conventional dimensions and simultaneously does not increase the likelihood of exceeding the loading capacity of the structure forming the pool.

It is therefore an object of the present invention to provide a spent nuclear fuel storage rack system which increases the storage efficiency of the volume of spent nuclear fuel storage pools of conventional dimensions and simultaneously does not increase the likelihood of exceeding the loading capacity of the structure forming the pool.

It is a further object of the present invention to provide either a stationary or mobile spent fuel rack assembly which is adapted to be pivotally or non-pivotally suspended from the walls of a spent nuclear fuel storage pool above and disconnected from conventional floor-supported spent fuel rack assemblies contained therein.

It is a further object of the present invention to provide a novel spent nuclear fuel storage canister construction.

It is a further object of the present invention to provide a novel apparatus for handling of spent fuel storage canisters.

Still other objects and advantages will become apparent in light of the attached drawings and written description of the invention presented hereinbelow.

SUMMARY OF THE INVENTION

Spent fuel storage pools at commercial nuclear plant generating stations are designed with a variety of geometric shapes to accommodate the fuel transport requirements to and from the reactor as well as to minimize the amount of fuel handling during refueling operations. The spent fuel storage bridge assembly of the present invention, hereinafter SFSB, may be designed to accommodate any pool geometry with varying degrees of interference with normal refueling apparatus. The SFSB is supported from the walls of the pool and may be either a stationary or a mobile structure having either a pivotally or non-pivotally mounted lower basket or cage portion which occupies a region of vertical space between the pool surface and the existing spent pool-fuel supported fuel storage racks. Using the SFSB, at least a 10-foot deep barrier of biological shield water and a 2-foot space between the top of the existing racks and the bottom of the SFSB can be maintained in a typical 38-foot deep pool. By limiting the full SFSB section height to 9 feet, up to a three-foot space beneath the biological shield water may be provided to accommodate underwater horizontal transference of spent fuel storage canisters to and from the SFSB. The width of the SFSB is determined by the spent fuel length and the resulting storage canister length. For example, in a typical design, a 14-foot long canister would accommodate the length of most fuel designs. Therefore, a typical SFSB width could be approximately 16 feet, thereby allowing approximately a one-foot space between the ends of the canister and the walls of the bridge.

The fuel canisters are positioned horizontally in the SFSB and vertically stacked within a frame structure or thermal spacer assembly, carried internally of the SFSB. In addition to providing lateral support to the stacked canisters, the thermal spacer assembly preferably provides a 1.0-inch water gap between canisters to permit cooling of the canisters by convection.

Supporting equipment for the SFSB include a fuel canister handling and positioning device and the fuel canisters. In order to transport fuel to the SFSB, the fuel must be enclosed in a protective canister. The canister, fabricated from borated stainless steel, will provide structural support for the fuel while stored in the horizontal position in the SFSB. The canister end fittings provide grapple points for the canister handling device and completely enclose the fuel assembly, except for the provision of water drain holes. The fuel-canister handling device in cooperation with a conventional crane, or the like, will provide vertical lift, rotation to the horizontal position, and transport of the canister to the SFSB. This handling device preferably would be operated entirely from the SFSB by a trained fuel handling crew.

DESCRIPTION OF THE PREFERRED EMBODIMENTS

Three typical geometries for water-filled spent nuclear fuel storage pools or wet storage facilities, herein designated by the letter P, are illustrated in FIGS. 1 and 1A, 2 and 2A, and 3 and 3A. The pool P is defined by a floor, an upper deck D, upstanding side walls defining the width of the pool and upstanding end walls defining the length of the pool. A wide assortment of spent nuclear fuel storage pool shapes other than those illustrated are in existence. However, since the focus of the present invention is not directed to the geometry of a spent nuclear fuel storage pool, the geometrics of the pools P illustrated in FIGS. 1, 1A, 2, 2A, 3 and 3A serve as convenient means to showcase the features of the spent nuclear fuel storage bridge (SFSB) 2, of the present invention. Accordingly, it will be appreciated that the SFSB 2 described herein may be so constructed so as to be adapted for use with a spent nuclear fuel storage pool P of virtually any geometry.

Figure 1:
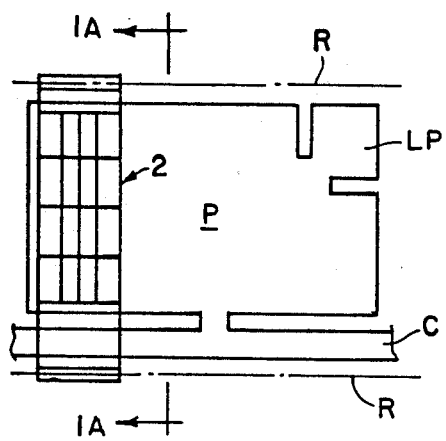
FIG. 1 is a schematic plan view of a spent nuclear fuel storage pool of a first geometry having a first embodiment of the spent nuclear fuel storage bridge of the present invention positioned therein.
Figure 1A:
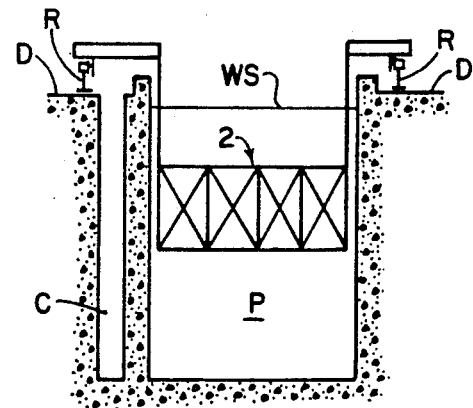
FIG. 1A is an elevational section view taken along line 1A—1A of FIG. 1.
Figure 2:
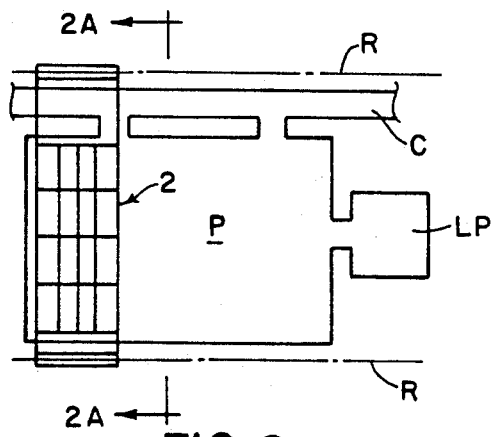
FIG. 2 is a schematic plan view of a spent nuclear fuel storage pool of a second geometry having the first embodiment of the spent nuclear fuel storage bridge of the present invention positioned therein.
Figure 2A:
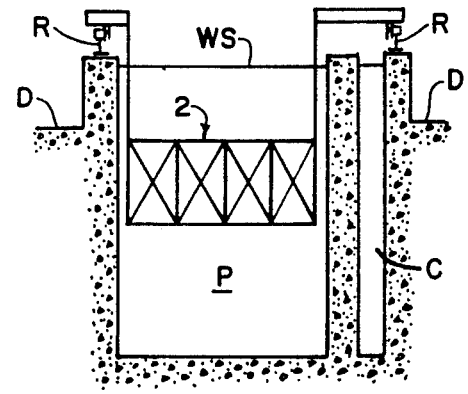
FIG. 2A is an elevational section view taken along line 2A—2A of FIG. 2.
Figure 3:
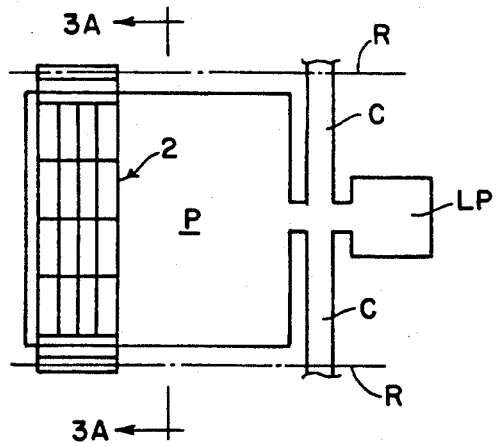
FIG. 3 is a schematic plan view of a spent nuclear fuel storage pool of a third geometry having the first embodiment of the spent nuclear fuel storage bridge of the present invention positioned therein.
Figure 3A:
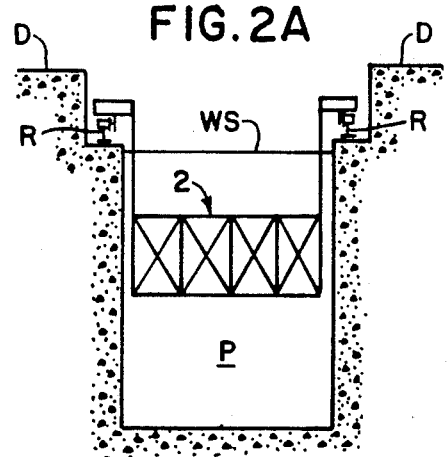
FIG. 3A is an elevational section view taken along line 3A—3A of FIG. 3.

In typical pool constructions, pool P is normally in fluid communication with canals C formed in the side and/or end walls of the pool and a spent nuclear fuel cask loading pit LP. The water surfaces of the pools P are designated by WS in FIGS. 1A, 2A and 3A. As is also quite common, opposite side wall upper deck areas of the pool P are provided with rails R for enabling mobile positioning of fuel handling and transporting equipment such as cranes or the like. In FIG. 1A, the rails R are supported by the side walls of the pool substantially at the surface of upper deck D. In FIG. 2A, the rails are supported by extensions of the pool side walls somewhat above the surface of the upper deck. And in FIG. 3A, the rails are supported on recessed ledges formed in the pool side walls at an elevation somewhat below the upper deck.

As will be later described, the SFSB 2 of the present invention, in several embodiments thereof, makes advantageous use of existing rail mounts R which enable the SFSB to be easily relocated to any position along the length of the pool P in order to provide ready access to fuel storage racks stored in the pool beneath the SFSB.

Vertical and horizontal seismic motion may be controlled through the SFSB deck mountings and hydraulic dampers carried on a lower basket portion of the SFSB, these various motion control systems being described in greater detail hereinbelow.

Figure 4:
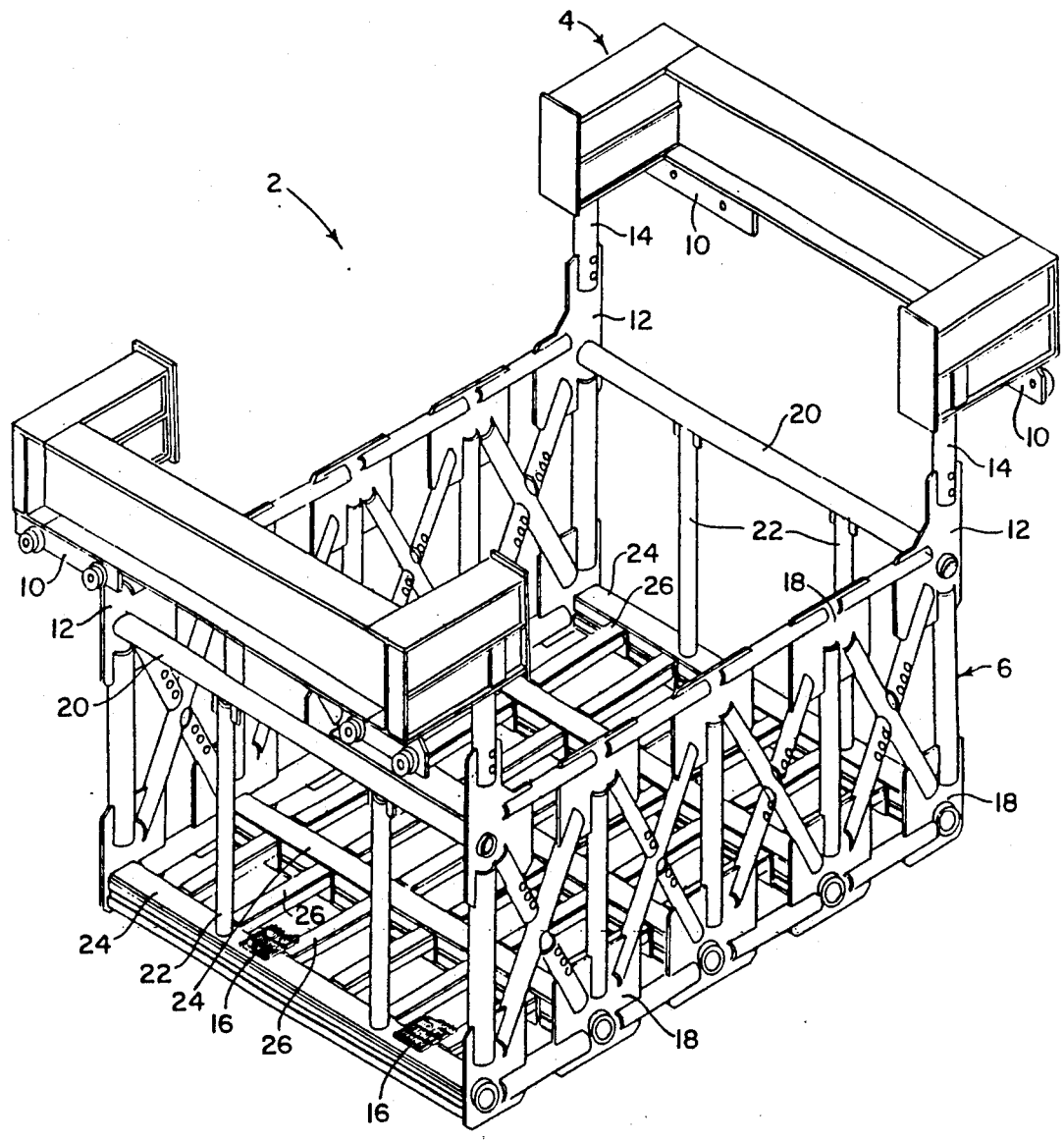
FIG. 4 is a perspective view of the first embodiment of the spent nuclear fuel storage bridge of the present invention.

Turning to FIG. 4, it is seen that the SFSB 2 is comprised of an upper portion 4 from which is suspended a lower cage or basket portion 6. These basic structural features are common to all contemplated embodiments of the SFSB of the present invention. The materials forming the SFSB preferably consist almost entirely of 300 Series stainless steel. Moreover, the fuel canister handling tool to described hereinbelow which also forms part of the present invention is preferably also constructed primarily from 300 Series stainless steel or anodized aluminum. However, small amounts of brass, as for fittings and the like, and lubricant may be used for moving components provided the handling tool is used for temporary service and stored outside the pool P when not in use.

The upper portion 4 of the SFSB includes spaced-apart reinforced frameworks 8 formed of high-strength channels, beams, or the like, which are positioned upon and supported by opposite side walls of the pool P when the SFSB is received therein. In accordance with the embodiment of the SFSB depicted in FIG. 4, and FIG. 5 to be described hereinbelow, the frameworks 8 are each provided with wheeled rail trucks 10 for enabling placement and support of the SFSB 2 on rails R, thereby permitting easy translation of the SFSB along the length of the pool P. The rail trucks 10 possess suitable brake means for fixing the SFSB at any desired position along pool P.

In the embodiment of the present invention presented in FIG. 4, nodal plates 12 at the upper four corners of the lower basket portion 6 of the SFSB are rigidly connected to the reinforced frameworks 8 by bar members 14.

In all embodiments of the SFSB, the lower basket portion 6 is configured to have an open top, a floor, opposed upright end walls and opposed upright side walls forming a rigid box-like structure. The floor is preferably covered by a grate which is partially shown at 16 in FIGS. 4 and 6. The end walls, in accordance with the preferred construction, are formed of a series of side-by-side trusses comprising brace members connected to one another and to nodal plates 18 similar to nodal plates 12. The side walls each are formed of at least one cross beam 20 joined at its opposite ends to nodal plates 12 and vertical support members 22 joined at their opposite ends to the cross beam 20 and the floor. The floor is preferably formed of a grid of interconnected longitudinally extending members 24 and transversely extending members 26.

Figure 5:
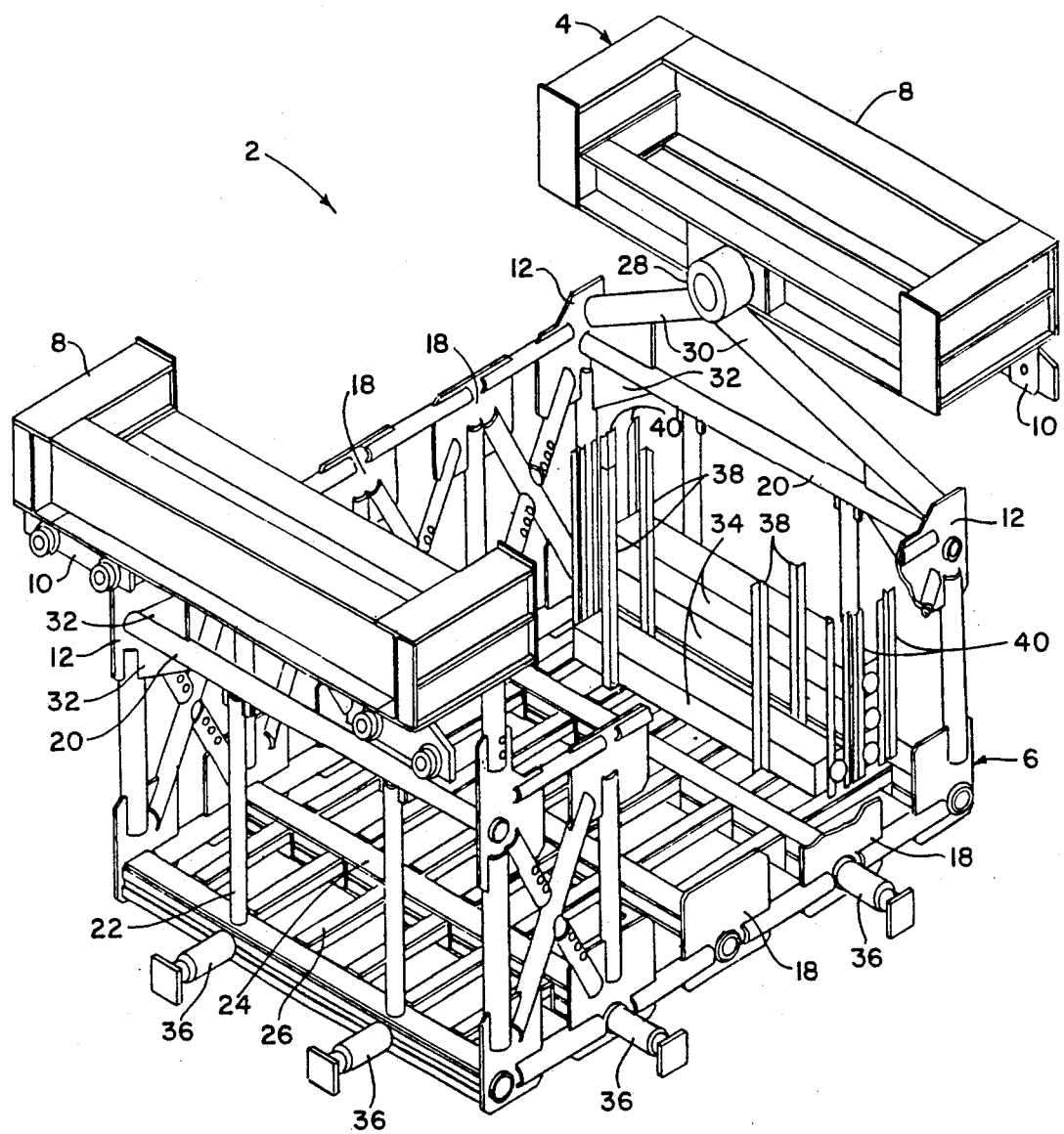
FIG. 5 is a perspective and partially cut-away view of a further embodiment of the spent nuclear fuel storage bridge of the present invention also illustrating a portion of a frame assembly carried internally of the bridge for enabling organized stacking, lateral and longitudinal support, and convectional cooling of spent nuclear fuel canisters placed in the bridge.

Turning to FIG. 5, wherein like references indicate similar elements, as is true in the remaining views, it is seen that the primary distinction between the SFSB 2 shown in this figure as compared with that depicted in FIG. 4 is that the lower basket portion 6 is pivotally secured to the upper portion 4 by a pair of trunnions 28, one of each pair of trunnions being secured to structure forming a part of a respective one of each reinforced framework 8. Attached to and downwardly depending from each of the trunnions 28 are a pair of outwardly diverging suspension arms 30 secured at their distal ends the nodal plates 12. In this embodiment, it is preferred that the suspension arms 30 and the cross beams 20 be reinforced by gusset plates 32 in order to maintain the shape of the lower portion 6 when loaded with spent nuclear fuel storage canisters 34 to be described hereinafter.

Constructed in accordance with FIG. 5 (or FIG. 7), the lower basket portion 6 of the SFSB 2 is permitted to pivot about trunnions 28 in order to self-level under the influence of seismic motion being imparted to the nuclear plat structure. The lower perimeter of the basket portion 6 is provided with a plurality of outwardly projecting, spaced-apart hydraulic motion dampening means or dashpots 36. The dashpots are most preferably designed to limit the motion of the basket portion 6 at its natural frequency as well as through the seismic frequency range prescribed by the plant-specific seismic response spectra. If two SFSB's are positioned in the pool adjacent one another, the spacing therebetween is preferably maintained by appropriate placing of dashpots at at least four locations on the end walls of the lower box portions 6 facing one another. Furthermore, dashpots may also be required on the rigidly suspended lower basket portion of the SFSB depicted in FIG. 4 depending upon the severity of the seismic response of the nuclear plant structure. However, in any application, a determination of the necessity, quantity, and impact or motion dampening capacity of the dashpots 36 must be determined by thorough engineering analysis.

Also illustrated in FIG. 5 is a portion of a thermal spacer frame assembly carried internally of the basket portion 6 for enabling organized stacking, for providing lateral and longitudinal support, and for permitting convectional cooling of the fuel canisters 34 when the same are placed in the basket portion. The thermal spacer frame includes a plurality of vertically oriented spacers 38, preferably in the form of one inch wide angle members fixed at their lower ends to the transversely extending members 26 of the floor of the basket portion 6, and a plurality of vertical lead-in guides 40 also attached to their lower ends to certain ones of the transversely extending members 26. It will be understood that although only shown situated in the basket portion 6 of FIG. 5, the thermal spacer frame assembly is present in and a critical feature of all contemplated embodiments of the present invention. However, it has not been represented in all the exemplified embodiments in order that the assemblage of elements forming the basket portion 6 could be clearly illustrated. A better understanding of the construction of the thermal spacer frame assembly may be had with reference to FIGS. 9 and 10 described hereinbelow.

Figure 6:
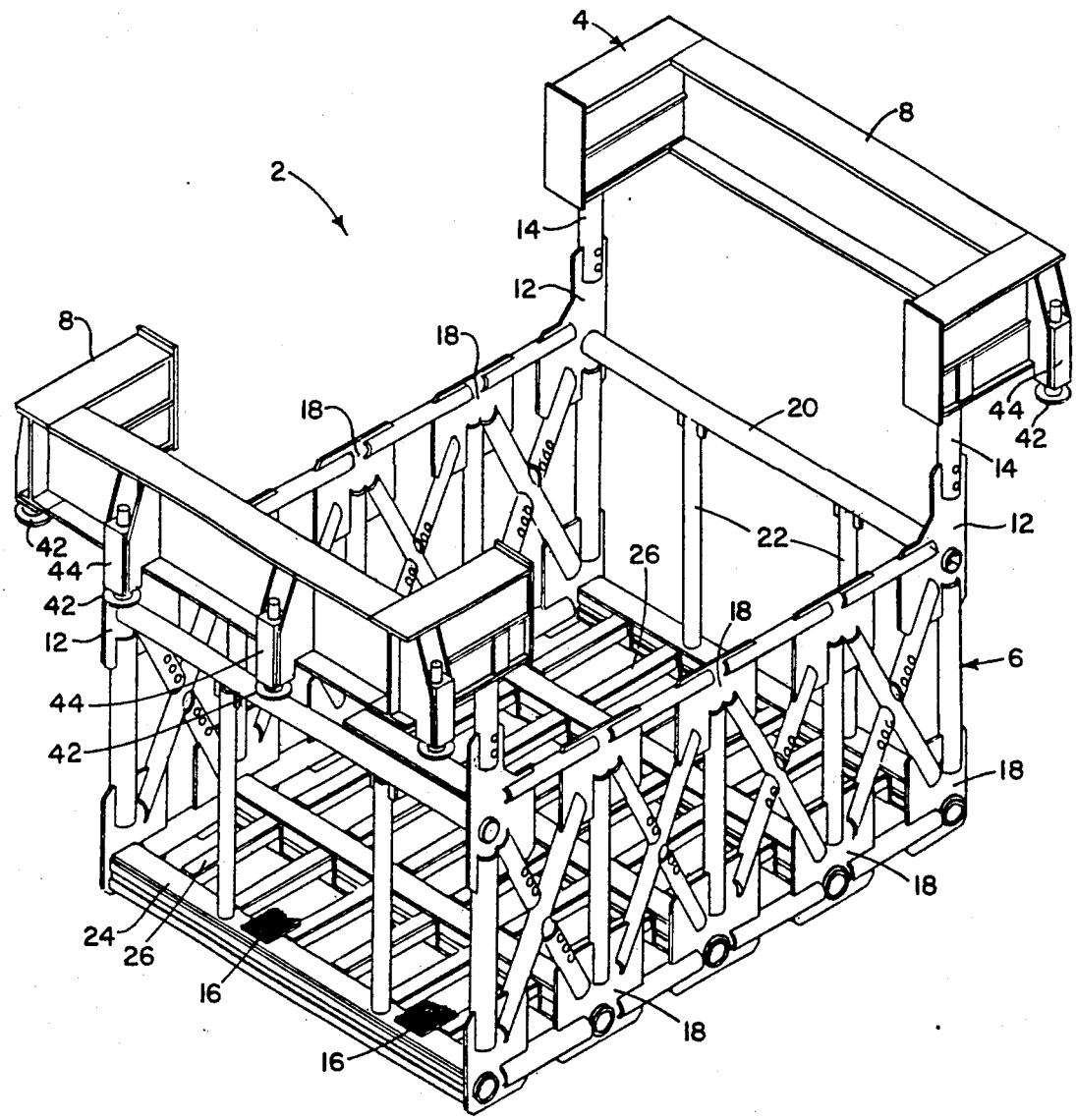
FIG. 6 is a perspective view of a further embodiment of the spent nuclear fuel storage bridge of the present invention.

FIG. 6 shows an SFSB construction similar in most regards to that shown in FIG. 4, except that instead of the wheeled rail trucks 10, the frameworks 8 of the upper mounting portion 4 are supported by a plurality of pads 42 carried on the lower ends height adjustable actuators 44 which, for example, may be comprised of mechanically, hydraulically, pneumatically or electrically activated extensible and retractable mechanisms attached to frameworks 8. Once the SFSB is placed as by crane or jacking into its desired position within pool P, the individual elevations of the pads 42 are appropriately adjusted by actuators 44 whereby the vertical loadings on the pool walls are equalized.

Figure 7:
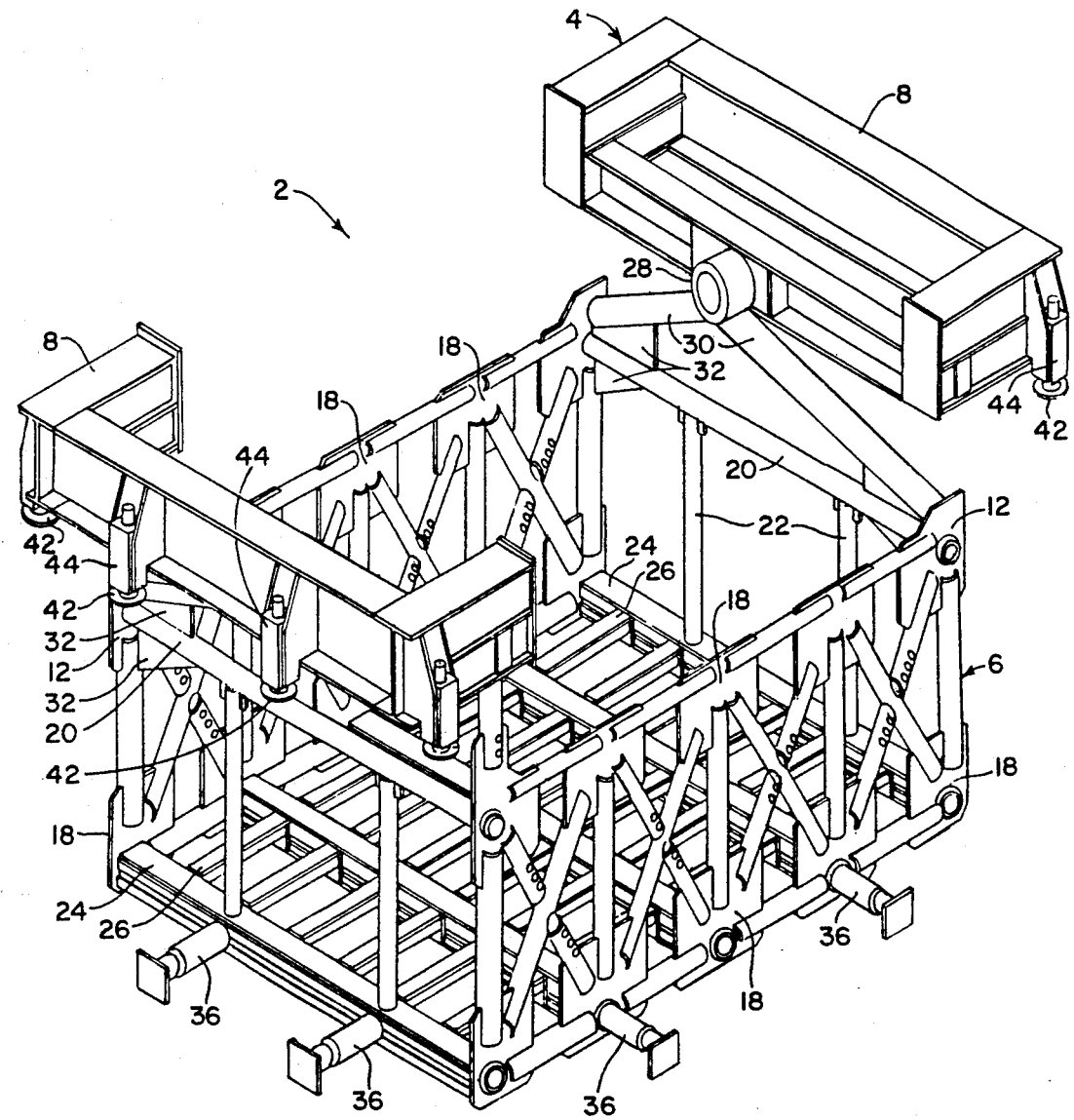
FIG. 7 is a perspective view of a further embodiment of the spent nuclear fuel storage bridge of the present invention.

In the embodiment of the SFSB exemplified in FIG. 7, which is similar to that of FIG. 5, the wheeled rail trucks 10 are once again replaced by pads 42 and extensible and retractable actuators 44. As will be appreciated, the embodiments of the SFSB depicted in FIGS. 6 and 7 represent stationary embodiments of the SFSB which are suitable constructions, and may possibly be preferred, if the resting position of the SFSB is to be at a specific location and the SFSB is not planned to be moved for an extended period of time.

Also, it is contemplated that the extensible and retractable actuators 44 be computer controlled such that during seismic activity the elevations of the pads 42 may be continuously adjusted so as to reduce motion and thereby stabilize the position of the SFSB. Furthermore, the wheeled rail trucks 10 shown in FIGS. 4 and 5 can also be mounted to the reinforced frameworks 8 by similar, and preferably computer controlled, height adjustment actuators.

Figure 8:
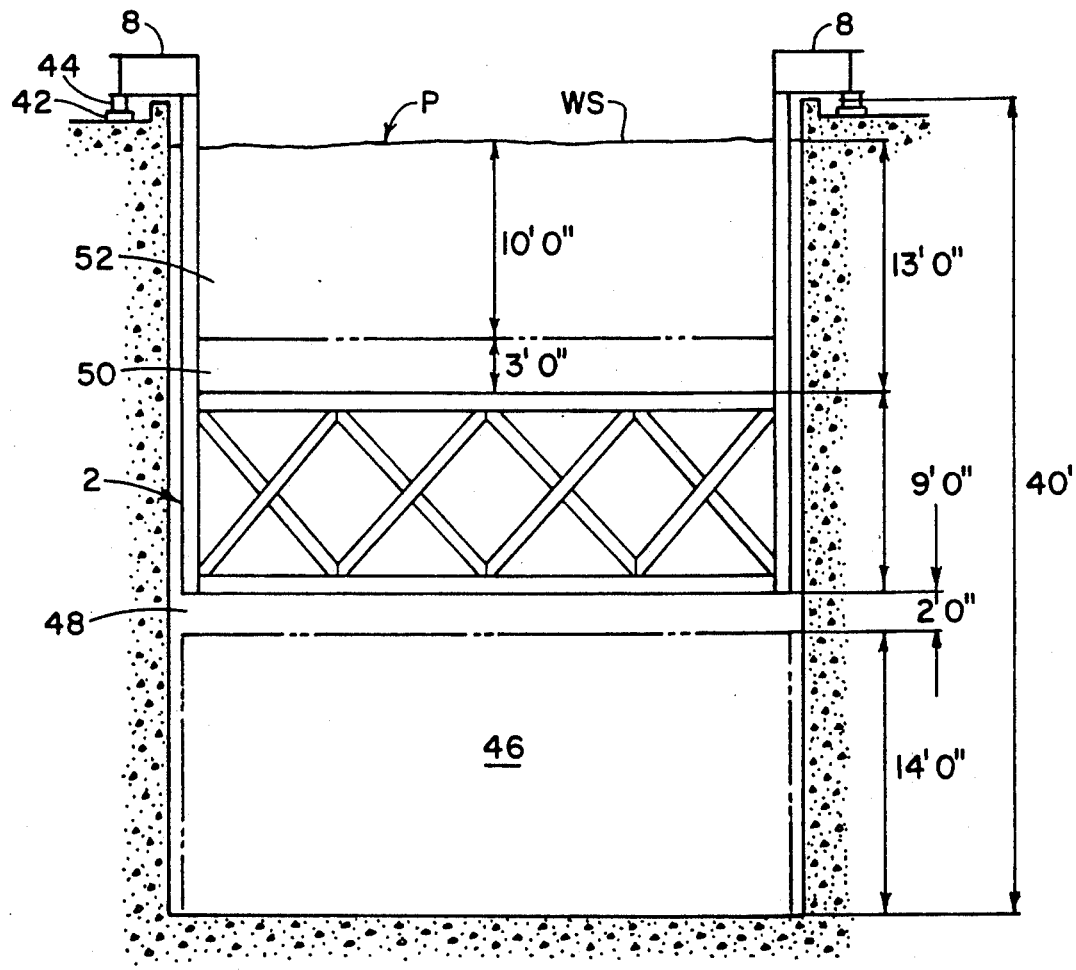
FIG. 8 is an enlarged view, similar to FIGS. 1A, 2A and 3A, of a second embodiment of the spent nuclear fuel storage bridge of the present invention positioned above existing floor-supported fuel racks in a spent nuclear fuel storage pool.

FIG. 8 exemplifies a preferred application of the SFSB of the present invention in a conventional spent nuclear fuel storage pool P having a depth of 40 feet. Resting upon the floor of the pool is at least one 14-foot high spent nuclear fuel storage rack 46. Once assembled, the SFSB is lowered as by crane, jacking mechanism, or the like, until pads 42 contact the deck on opposite sides of the pool. The height of each pad is then set by its actuator 44 until the bottom of the lower basket portion 6 becomes positioned approximately two feet above the top of the rack 46 in order to provide a sufficient cooling gap 48 between the SFSB and storage rack 46. For a pool having a depth of 40 feet, it is preferred that the height of the lower basket portion 6 not exceed nine feet so that there can be maintained at least a three-foot deep fuel canister transport zone 50 through which fuel canisters are placed in the basket via method and apparatus to be described hereinbelow. Consequently, a mass of biological shield water 52 having a depth no less than ten feet can be maintained at all times above the top of the fuel transport zone 50.

Figure 9:
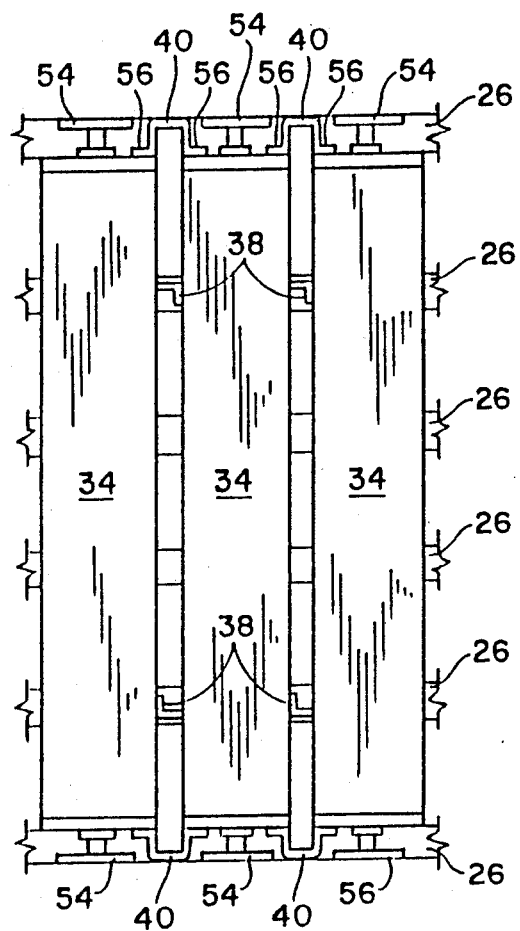
FIG. 9 is an enlarged plan view of a portion of a frame assembly carried by the spent nuclear fuel storage bridge of the present invention within which novel spent nuclear fuel storage canisters also constructed in accordance with the present invention are stacked.
Figure 10:
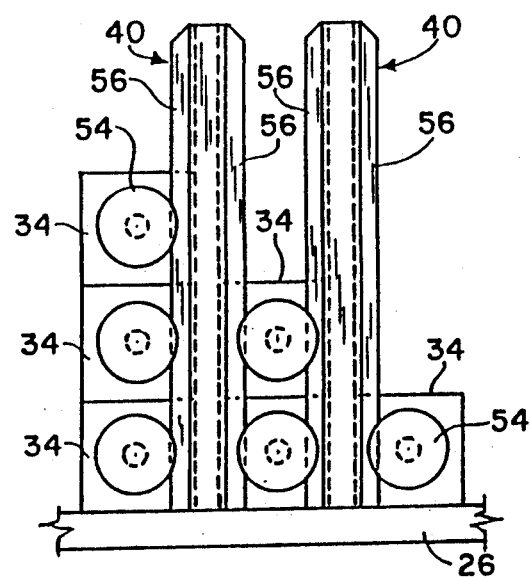
FIG. 10 is an elevational view of the frame assembly depicted in FIG. 9.

The proper placement of the nuclear fuel canisters 34 within the basket portion 6 of the SFSB can be seen in FIGS. 9 and 10. As noted hereinabove, the basket portion is fitted with a thermal spacer frame assembly comprised of vertically extending spacers 38, preferably formed as one-inch wide angle members and vertical lead-in guides 40, each of which area secured to the floor of the basket portion 6. When loading the basket portion, each canister 34 is grasped and placed into a horizontal position by a handling apparatus to be described later. Each of the canisters 34, which are preferably square in cross-section, includes at its opposite ends enlarged grapple buttons 54 projecting outwardly from canister covers which are described in greater detail hereinbelow. Buttons 54 engage in recessed areas formed between opposed flanges 56 of adjacent lead-in guides 40. The canisters 34 are vertically stacked atop one another and are held in lateral spacing by the presence of spacers 38 which not only provide sufficient space for permitting convectional cooling to occur between the stacks of canisters but also provide lateral support for the canisters to prevent lateral shifting thereof out of the vertically oriented stacked configuration. Whereas, the lead-in guides 40 serve to enable consistent placement of the ends of the canisters and prevent longitudinal shifting of the canisters, thereby establishing and maintaining essentially vertical alignment of the ends of the vertical stacks of canisters within the basket portion 6.

Figure 11:
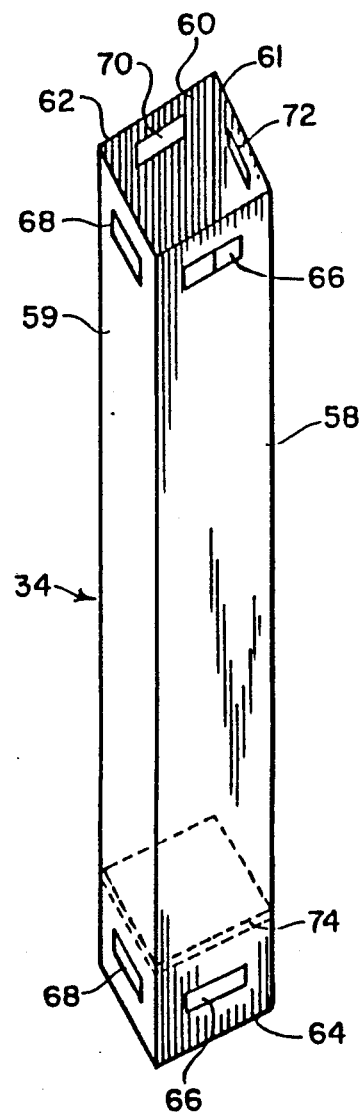
FIG. 11 is a perspective view of a nuclear fuel storage canister forming part of the present invention.

FIG. 11 shows an enlarged view of a spent nuclear fuel storage canister 34 constructed in accordance with the present invention. The canister is preferably fabricated from borated stainless steel or similar highly neutron-absorbent material.

The storage canister 34 is comprised of sidewalls 58, 59, 60 and 61. The sidewalls 58–61 are configured such that the canister 34 is of a square cross-sectional area. Other geometric arrangements are, of course, similarly possible. Formed to extend through the sidewalls 58–61 at portions proximate to ends 62 and 64 of canister 34 are support windows 66, 68, 70 and 72, respectively. The sidewalls of the canister 34 form an enclosed area suitable for the placement therein of nuclear waste material, and, in particular, for the placement therewithin of nuclear fuel rods. The support windows 66, 68, 70 and 72 serve simultaneously as latch sites for enabling canister covers (to be described herebelow) to be attached to the ends of the canister and as water drain holes for enabling enhanced cooling of the stored fuel rods. As mentioned previously, compaction methods and apparatus are known in the art for consolidating and compacting nuclear waste material and for storing the nuclear waste material in a storage canister such as storage canister 34. In order to allow the storage of spent nuclear fuel rods in the canister 34, the canister is of a length substantially corresponding to the length of the nuclear fuel rods, which are generally thirteen to fifteen feet in length. For reasons to be described, near one end of the canister, e.g., near end 64, there is provided a false bottom 74 in the form of a plate secured to the interiors of the sidewalls of the canister.

Figure 12:
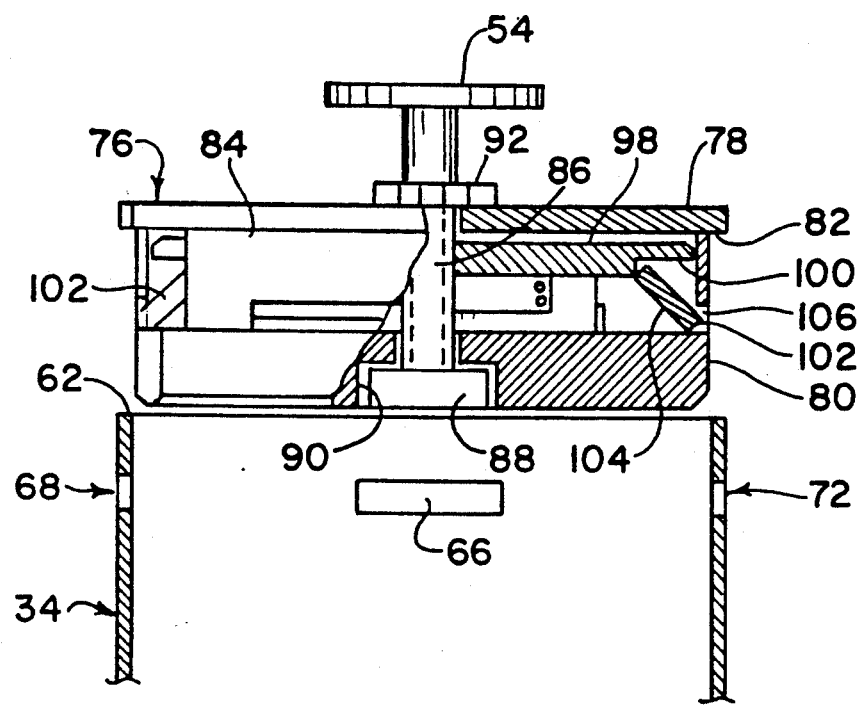
FIG. 12 is a partial, sectional, exploded end view of the nuclear fuel storage canister and canister cover forming a portion of the present invention.
Figure 14:
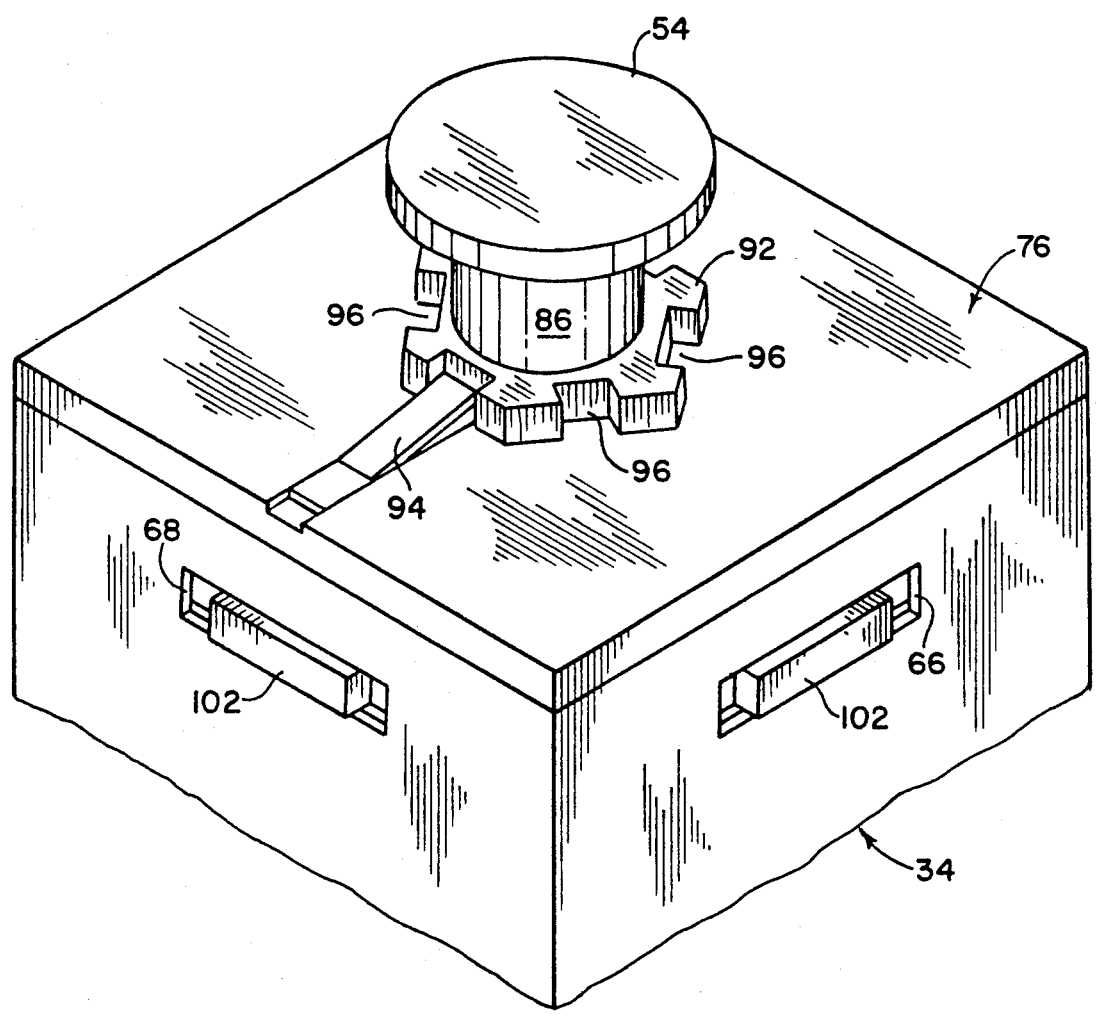
FIG. 14 is an enlarged perspective view of an end of the spent nuclear fuel storage canister in assembled condition.

Turning to FIG. 12, there is shown a canister cover, referred to generally by reference numeral 76, forming a portion of the present invention. Canister cover 76 is of dimensions allowing the placement thereof upon end portions 62 and 64 of storage canister 34. Canister cover 76 includes top plate 78 and bottom plate 80. Bottom plate 80 is of dimensions less than the internal area of the storage canister 34, and top plate 78 is of dimensions such that a bottom outer perimeter 82 thereof rests upon the ends 62 and 64 of sidewalls 58-61 of the canister 34. Bottom plate 80 is maintained at a predetermined distance from top plate 78 by sidewalls 84 formed to extend about a perimeter of the cover 76. Threaded shaft member 86 is positioned to extend between top plate 78 and the bottom plate 88, preferably at the center portions thereof. Bar member 88 is affixed to a bottom end of shaft member 86, and, in the preferred embodiment, bottom plate 80 contains an indentation 90 forming a support surface to allow supportive engagement of bottom plate 80 upon bar 88. Affixed to a top end of shaft member 86 is grapple button 54 which extends above and generally parallel to a top surface of top plate 78. Because both bar 88 and grapple button 54 are affixed to shaft 86, rotation of button 54 causes rotation of both shaft 86 and bar 88. A locking ring 92 is supported upon a top surface of plate 78 and is utilized to lock the position of the shaft 86 and hence the button 54 into a desired position. A biased latch member 94 (FIG. 14) snaps into one of several detents 96 formed in locking ring 92 to prevent movement of locking ring from its set position.

Positioned between top plate 78 and bottom plate 80, and threadedly engaged with shaft member 86, is retainer plate 98. Retainer plate 98 is of dimensions for allowing the positioning thereof within the interior chamber formed by canister 34 and is preferably of widthwise and lengthwise dimensions such that side portions of plate 98 abut against sidewalls 84. In such an arrangement, because plate 98 is prohibited from rotation due to the abutment against sidewalls 84, rotation of threaded shaft member 86 causes vertical translation of the retainer plate 98 between the top plate 78 and bottom plate 80.

Opposite edge portions of the bottom surface of the retainer plate 98 form support surfaces 100. Locking bars 102 are hingedly coupled to the bottom surface of retainer plate 98 by hinge members 104. Locking bars 102 are of dimensions allowing for their insertion into apertures 106 formed in the sidewalls 84 of the canister cover 76, and into the support windows 66, 68, 70 and 72 in the sidewalls of the storage canister 34. Hinge member 104 may, for example, be comprised of thin, sheet metal strip which is spot welded to the bottom surfaces of both retainer plate 98 and the respective locking bars 102.

Figure 13:
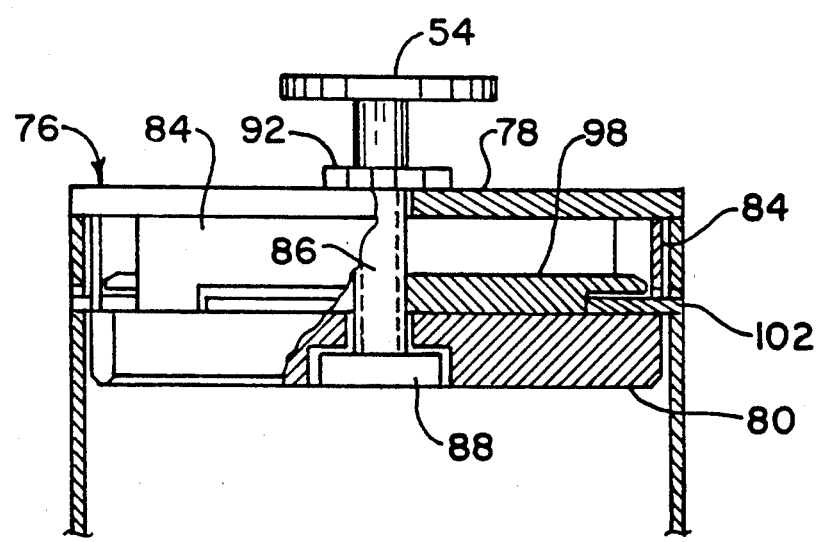
FIG. 13 is a partial sectional view of the canister and canister cover similar to that of FIG. 12, but illustrating the connection between the canister cover and the sidewalls of the storage canister.

The sectional view of FIG. 13 is similar to the illustration of FIG. 12, but illustrates the canister cover 74 positioned in an interlocking and latched relationship with the storage canister 34. FIG. 13 illustrates the interlocking supportive engagement between the locking plates 102 and the support windows 66, 68, 70 and 72 formed to extend through the sidewalls of storage canister 34. It is to be noted that, in the preferred embodiment, the support windows are formed to extend through each of the four sidewalls 58-61 of the storage canister 34, and retainer plate 98 accordingly supports four locking plates 102 corresponding in number and position with the support windows. However, greater or fewer numbers of locking plates and support windows may be utilized by the storage apparatus of the present invention. As will be understood, when locking plates 102 are positioned to maintain an interlocking engagement with the support windows of the canister, a handling tool may be utilized to engage with grapple button 54 in order to handle and transport the storage canister. By merely rotating the threaded shaft member 86, such as, for example, by applying a rotational torque to grapple button 54, the retainer plate 98 is translated in the vertical direction in order to position the locking plates 102 into either interlocking engagement or non-interlocking engagement with the support windows of the storage canister 34. When locking plates 102 are properly positioned to maintain interlocking engagement with the support windows 66, 68, 70 and 72 of the storage canister 34, each of the locking plates 102 is maintained in a confronting face-to-face engagement with both support surface 100 of retainer plate 98, and the top surface of bottom plate 80. Hence, force applied to grapple button 54 by a remotely operated handling tool, preferably of the type to be described herebelow, causes a corresponding translation of the storage canister 34.

According to the preferred embodiment of the present invention, covers 76 are normally provided on both ends 62 and 64 of canister 34 for permitting transport and handling by the later-described handling apparatus. However, the provision of the aforenoted false bottom 74 permits the bottom cover 76 to be removed from end 64 of canister 34 whereby the canister can be transported in a simple and conventional vertical manner. That is, by removing the cover 76 from the end 64, the canister can be placed in a cask and subsequently handled in a fashion generally similar to that used for conventional canisters.

Figure 15:
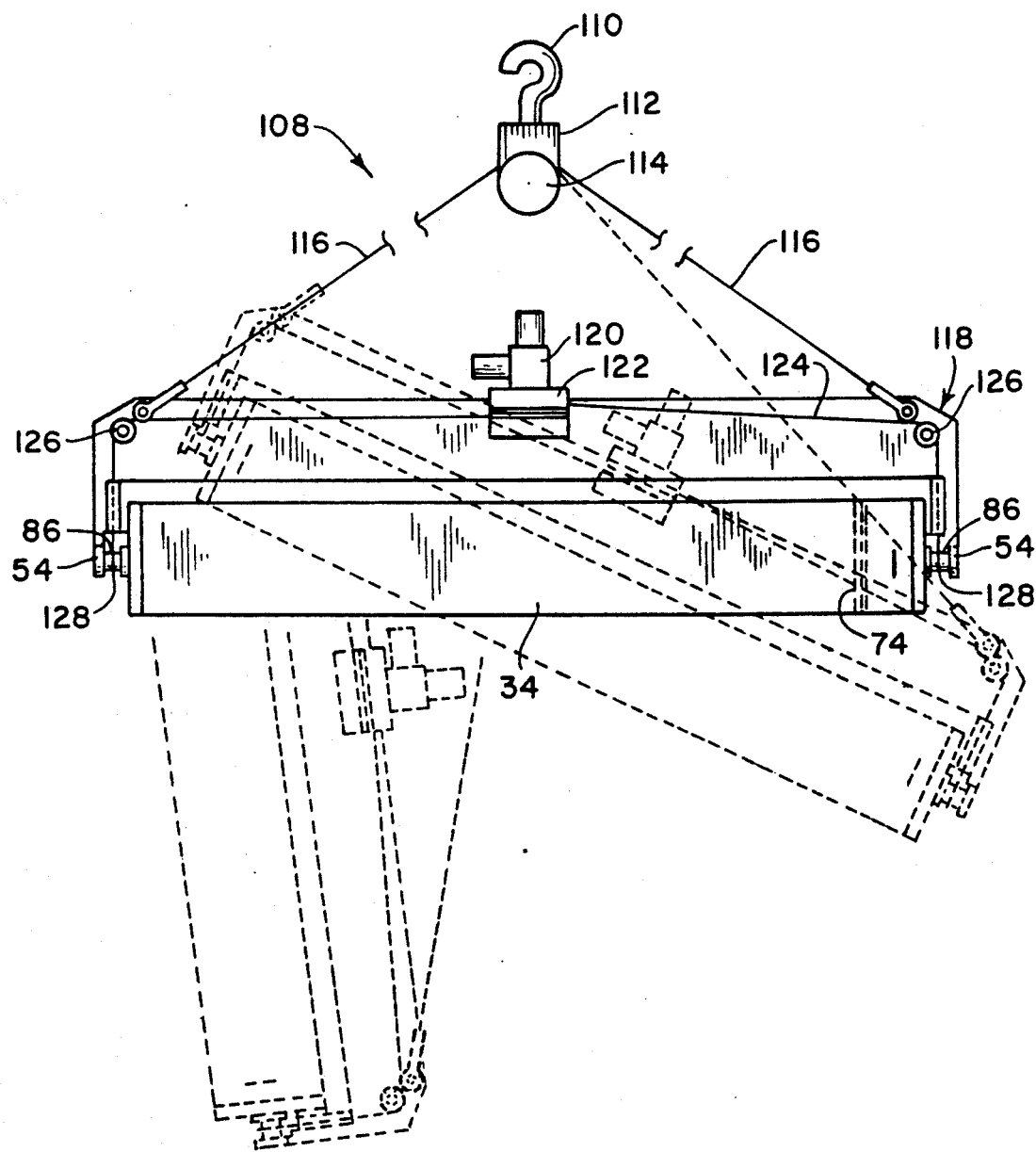
FIG. 15 is a view of a spent nuclear fuel storage canister handling apparatus constructed in accordance with the present invention.

FIG. 15 depicts the preferred construction of the remotely operated fuel canister handling and transport tool 108 forming part of the present invention. The tool includes a hook 110, or similar element, for enabling the tool 108 to be suspended from a crane, or the like (not illustrated). Carried by the hook 110 is a rotator winch 112 which is preferably operated by an electric motor receiving power transmitted along an electrical line from a power source carried on the upper deck mounting portion 4 of the SFSB. The rotator winch is thus operated above the water surface WS.

The rotator winch 112 includes a winch drum 114 around which is trained a high strength cable 116 having opposite ends pivotally attached to opposite ends of a handling beam 118. Cable 116 must be of such length that the handling beam is at all times maintained below the bottom of the biological shield water 52 (FIG. 8). Operation of the rotator winch motor causes rotation of the winch drum 114 thereby enabling orientation of the handling beam 118 (and any canister 34 held thereby) to substantially any position between horizontal and vertical as indicated by the solid and dashed lines of FIG. 15.

Carried by the handling beam 118 is a grapple winch 120 including a winch drum 122 around which is trained a second high strength cable 124. Grapple winch 120, being operated underwater, is preferably of manual or pneumatic operation. Opposite end portions of cable 124 are guidingly passed over pulleys 126 which are rotatably carried by handling beam 118 near opposite ends thereof. The distal ends of cable 124 are formed into cable loops 128 whose diameters are capable of being enlarged and contracted. Operation of the grapple winch 120 so as to turn winch drum 122 in a first direction causes the wire loops 128 to enlarge or expand. In such expanded condition, the wire loops are able to be placed, through proper manipulation of the crane controls and those of the rotator winch 112, over grapple buttons 54 and then around shaft members 86. Once positioned, the wire loops are contracted and tightened around the shaft members 86 by reverse operation of grapple winch 120. In the tightened condition of the wire loops 128, the grapple buttons 54 provide means for preventing slippage of the wire loops from the shafts 86. Grapple winch 120 is preferably operated until the cable 124 is retracted to a position whereat the grapple buttons contact the lower edges of the handling beam 118. In such position the canister 34 is ready for rotation by the rotator winch 112 and transport to (or from) the SFSB by the crane.

Loading Procedure

The SFSB is designed as a semi-permanent storage for fuel with high burn-up and/or 6-years out of the core. The boron content of the borated stainless steel of the canister 34 will be sufficient to assure maintenance of the effective multiplication factor ($K_{eff}$) for the full array of canisters below the point of criticality and, preferably, at $K_{eff} < 0.95$ at all times. Therefore, an administrative control for criticality and thermal heat generation control will be required depending on the plant specific requirements.

Having identified and located the desired fuel for SFSB storage, the fuel would be first placed into a storage canister 34. This procedure starts with placing an empty canister, bottom end closed and bottom cover 76 preinstalled, into an empty cell of a spent fuel rack. With the canister 34 in the rack cell, lower a spent fuel assembly into the fuel storage canister. Thereafter, place and lock the top end cover 76 on the canister 34 with a long handle tool (not shown). Lift the fuel-canister out of the rack cell with the long handle tool to a position whereat the top end 62 is about 10 feet below the water surface. Lower the handling tool 108 to a position beneath the canister 34 and then slowly raise the tool 108 so that the wire loops 128 are in alignment with the grapple buttons 54 on opposite ends of the canister. Operate the grapple winch 120, with an air pressure actuator or manual tool, to first capture the fuel canister and then tighten the loops about the shafts 86 to tightly hold the canister. Activating the rotator winch 112 then causes the canister to be brought into a horizontal position. The handling tool 108 and retained canister 34 are then transported through the fuel transport zone 50 (FIG. 8) into an position above the thermal spacer frame within the lower basket portion 6 of the SFSB. The canister is then properly aligned to a position wherein shafts 86 will be received between the opposed flanges 56 of the lead-in guides 40 on opposite sides of the thermal spacer frame. Subsequently, the canister is lowered into position between the thermal spacers 38 while guided by lead-in guides 40. The canister is then released by activating the grapple winch 120 to enlarge the wire loops 128 whereby the handling tool 108 is removed. As will be appreciated, the canister 34 and its contained fuel may be retrieved by a reversal of the above-described operations.

As noted at the outset, the SFSB is to be fabricated from structural stainless steel and can be designed to span the width of any existing or newly-constructed storage pool. For purposes of illustration only, let it be assumed that a 20-foot wide × 40-foot deep pool P was selected as having typical SFP dimensions for a small boiling water reactor (BWR) pool. An approximately 18-foot wide truss type lower basket portion 6 for substantially spanning the 20-foot pool width can be designed to support 250–280 spent fuel assemblies in a horizontal position above the existing fuel storage racks 46 and below a 10 feet biological shield of pool water. The canistered fuel may be stacked horizontally twelve high and twenty four across, separated into vertical columns or stacks by one inch wide angles 38 to promote cooling flow upward along two opposite side walls of every canister. Assuming a 1682 lb. fuel assembly in a 200 lb. canister (high values, dry), the dead load of the canistered fuel is approximately 260 tons. With an estimated bridge structure weight of somewhat less than 100,000 lbs., the design total dead load is approximately 620,000 or 310 tons.

Instead of supporting this load on the pool floor where concentrated loads of this magnitude would be difficult to distribute into acceptable pool floor loads, particularly if existing storage racks 46 are present, the SFSB is suspended from the pool walls, which usually are between 4 and 7 feet thick, whereby the vertical load can be carried down to the pool foundation slab easily without imposing any additional concentrated loads directly on the pool floor.

For a pool of the aforenoted dimensions, the SFSB 2 weighs less than 100,000 lbs. empty and can be transported to the nuclear station in four sections by wide load truck. The outside dimensions of the largest sections would be 9 feet × 9 feet × 16 feet. Joining of the two large bridge sections, i.e., those sections forming lower basket portion 6, by welding and thereafter joining the basket portion with the two deck supports, i.e., reinforced frameworks 8, by pinning would be required after arrival at the site. To gain access to the pool area, the large sections of the SFSB may be hoisted to, and passed through, the equipment door. The large crane and staging locations used for the high level waste cask manipulations may be used for the SFSB positioning and assembly. Once the SFSB is assembled and positioned near the pool area, the cask crane or suitable rollers may be used to position the SFSB over the pool. The SFSB may be then carried or rolled to a position above the final planned pool location. The SFSB is then lowered into final position by crane or jacking. The eight pads 42 or the wheeled rail trucks 10 are leveled to equalize the vertical loading on the pool walls.

Since the SFSB design would allow 10–13 feet of water level above the maximum stored fuel height, a loss of water accident should not be a problem as long as their is also provided automatic water level control of plus or minus one foot, and water level alarms. Suction levels for normal draining, however, may require relocation to prevent accidental draining below the raised SFSB fuel level.

Since the volume of the pool water would be necessarily reduced by the introduction of an SFSB as above-described, the pool full core off-load temperature would rise somewhat. In addition, with the SFSB stored fuel at a higher pool elevation, the fuel canister cooling rate by natural convection would be reduced. These thermal-hydraulic effects can be offset by limiting SFSB-stored fuel to a minimum of 5-6 years out-of-core fuel. Administrative controls to implement this condition and, as is done with a standard spent fuel rod (SFR) reracking, a complete pool thermal reanalysis would be required.

The SFSB design example described above will provide semipermanent storage of about 275 pressurized water reactor (PWR) or 1267 boiling water reactor (BWR) fuel assemblies, without fuel consolidation and without adding an exterior facility, thereby providing an existing nuclear station with about 4-5 additional operating cycles at economical costs. A larger single SFSB, of typically 28 foot width for a 30 foot wide SFP, could store up to 428 PWR and 1982 BWR canistered fuel assemblies at similar incremental cost per stored fuel assembly.

In a like manner, a storage bridge similar to that described above for LLW or consolidated NFBC may be constructed at an even more economical material cost than the particular SFSB designs described above. Furthermore, the storage concept in accordance with the present invention would be particularly advantageous for pools having reached their limits in existing pool floor space or pool floor weight loading. Here again, the lack of physical interference with existing storage racks provides a distinct conceptual advantage.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. In combination with a water pool having a floor and upstanding walls, a system for storing nuclear waste in said pool, said system comprising:
   a plurality of spent nuclear fuel rod storage canisters:
   basket means immersed in and substantially spanning said pool for storing said plurality of canisters, said canisters being positioned horizontally in said basket means;
   frame means carried within said basket means for maintaining the horizontally positioned storage canisters in a plurality of spaced apart vertical stacks, thereby enabling cooling to occur along opposite side regions of each storage canister, said frame means including a plurality of vertically oriented spacers secured to said basket means and extending between each of said plurality of vertical stacks, said spacers providing lateral support for said canisters while permitting said cooling thereof, said frames means further including a plurality of guides secured to said basket means for establishing and maintaining substantially vertical alignment of longitudinal ends of said vertical stacks; and
   means supported on said pool walls for suspending said basket means from said pool walls.

2. The system of claim 1 wherein said means for suspending comprise means for non-pivotally suspending said basket means from said pool walls.

3. The system of claim 1 further comprising at least one spent nuclear fuel rack supported on said pool floor, said basket means being suspended above and disconnected from each of said at least one spent nuclear fuel rack.

4. The system of claim 3 wherein said means for suspending comprise means for non-pivotally suspending said basket means from said pool walls.

5. The system of claim 4 wherein said pool walls have rails located thereon and said means for suspending further comprise wheeled rail truck means for engaging with said rails and permitting translation of said basket means through said pool.

6. The system of claim 4 wherein said means for suspending further comprise height adjustable means for engaging said pool walls and equalizing vertical loadings applied to said pool walls by said means for suspending, said basket means, and said canisters stored in said basket means.

7. The system of claim 1 further comprising means carried by said basket means for dampening motion of said basket means at the natural frequency thereof as well as through a predetermined seismic frequency range.

8. The system of claim 1 wherein said means for suspending comprise means for pivotally suspending said basket means from said pool walls.

9. The system of claim 3 wherein said means for suspending comprise means for pivotally suspending said basket means from said pool walls.

10. The system of claim 9 wherein said pool walls have rails located thereon and said means for suspending further comprise wheeled rail truck means for engaging with said rails and permitting translation of said basket means through said pool.

11. The system of claim 9 wherein said means for suspending further comprise height adjustable means for engaging said pool walls and equalizing vertical leadings applied to said pool walls by said means for suspending, said basket means, and said canisters stored in said basket means.

12. The system of claim 1 wherein said canisters include cover members constructed and arranged to be removably attachable to opposite ends of said canisters.

13. The system of claim 12 wherein said canisters further include a false bottom near one of said ends opposite thereof.

14. The system of claim 12 wherein each said cover member includes a shaft projecting outwardly therefrom when said cover member is attached to one of said canisters and an enlarged grapple button affixed to a distal end of said shaft, said grapple buttons of said cover members being adapted for engaging in recessed areas formed between adjacent ones of said guides.

15. The system of claim 14 further comprising means for handling said canisters, said means for handling comprising:
   means for releasably engaging said projecting shafts of said cover members when pairs of said cover members are attached to opposite ends of said canisters;

means for rotating said canister between substantially vertical and substantially horizontal positions; and means for connecting said canister to equipment for vertically and horizontally transporting said canister.

16. In combination with a water pool having a floor and upstanding walls, a system for storing nuclear waste in said pool, said system comprising:

a plurality of spent nuclear fuel rod storage canisters including:

handling structure including shafts affixed to project outwardly from opposite ends thereof, said system further including:

a handling beam;

first means carried by said handling beam for releasably engaging said handling structure at said opposite ends of said canisters;

second means connected to said handling beam for rotating said canister between substantially vertical and substantially horizontal positions;

means carried by said handling beams for vertically and horizontally moving a canister supported thereby;

basket means immersed in and substantially spanning said pool for storing said substantially of canisters, said canisters being positioned horizontally in said basket means; and means supported on said pool walls for suspending said basket means from said pool walls.

17. The system of claim 16 wherein said means for releasably engaging comprise expandable and retractable loops adapted for gripping and releasing said shafts.

* * * * *